(12) United States Patent
Plante et al.

(10) Patent No.: US 6,409,555 B1
(45) Date of Patent: Jun. 25, 2002

(54) DEVICE FOR GENERATING A PLUME OF WATER

(75) Inventors: Thomas M. Plante, Woodbury; Mary S. Slagle, Roseville; Michael J. Nanoff, Bloomington; Valdin C. Omvig, Fairmont; Christopher M. Root, Minneapolis; Mark J. Brandenhoff, Bloomington; Adam Stapleton, Eagan; Daniel P. Longhenry, New Hope; H. Peter Gardner, Edina, all of MN (US)

(73) Assignee: Rave Sports, Inc., Mounds View, MN (US)

( * ) Notice: Subject to any disclaimer, the term of this patent is extended or adjusted under 35 U.S.C. 154(b) by 0 days.

(21) Appl. No.: 09/634,128

(22) Filed: Aug. 8, 2000

(51) Int. Cl.⁷ ................................................ B63H 11/00
(52) U.S. Cl. .......................................... 440/39; 441/71
(58) Field of Search ........................... 441/71; 114/345; 440/39

(56) References Cited

U.S. PATENT DOCUMENTS

| | | | |
|---|---|---|---|
| 2,940,091 A | 6/1960 | Fifer | 9/310 |
| 2,983,508 A | 5/1961 | Modine | 272/8 |
| 3,020,568 A * | 2/1962 | Tierney | 441/71 |
| 3,052,899 A | 9/1962 | Antoine | 9/310 |
| 3,077,616 A | 2/1963 | Billingham | 9/310 |
| 3,229,312 A | 1/1966 | Smith | 9/310 |
| 3,255,472 A | 6/1966 | Thorne | 9/310 |
| 4,293,968 A | 10/1981 | Levine | 9/310 |
| 4,735,436 A | 4/1988 | Rogalski et al. | 280/809 |
| 4,832,632 A | 5/1989 | Rogozienski | 440/39 |
| 5,150,663 A | 9/1992 | Kobayashi | 116/209 |
| 5,356,324 A | 10/1994 | Cunningham | 441/79 |
| 5,846,104 A | 12/1998 | Corcoran | 440/39 |
| 5,888,110 A | 3/1999 | Haller et al. | 441/66 |

* cited by examiner

Primary Examiner—Stephen Avila
(74) Attorney, Agent, or Firm—Allison Johnson, P.A.

(57) ABSTRACT

The invention features a device for generating a plume of water, the device including a) a first side wall, b) a second side wall extending at an angle to the first side wall, the first side wall and the second side wall defining a tapered channel, the channel including i) a first end, ii) a second end, and iii) a longitudinal extent extending between the first end and the second end, c) a first flange extending at an angle to the first side wall, and d) a second flange extending at an angle to the second side wall.

50 Claims, 8 Drawing Sheets

DEVICE FOR GENERATING A PLUME OF WATER

BACKGROUND OF THE INVENTION

The invention relates to creating a plume of water.

Many people enjoy the use of personal watercrafts on bodies of water such as lakes, rivers and oceans. Others enjoy the thrill of being towed behind a motorized watercraft on various devices such as skis, kneeboards, wakeboards, tire inner tubes, and other inflatable products of various shapes and sizes. The popularity of these products has grown over the years. At times, it can be difficult for boaters and other water traffic to see a rider on a personal watercraft or a device that is being towed behind a boat.

Some personal watercraft manufacturers have used the pressure exerted by the engine's impeller to direct and/or propel a portion of the water of the jet spray created by the personal watercraft in an upward direction behind the personal watercraft. The water that is shot up into the water forms a plume that is often referred to as a "rooster tail." The plume of water is easy to see from a distance and thus increases the visibility of the rider and the personal watercraft.

SUMMARY

In one aspect, the invention features a device for generating a plume of water, the device including a) a first side wall, b) a second side wall extending at an angle to the first side wall, the first side wall and the second side wall defining a tapered channel, the channel including i) a first end, ii) a second end, and iii) a longitudinal extent extending between the first end and the second end, c) a first flange extending at an angle to the first side wall, and d) a second flange extending at an angle to the second side wall.

In one embodiment, the first flange extends from a portion of the first side wall and the second flange extends from a portion of the second side wall. In another embodiment, the device further includes a third side wall, the third side wall extending from the first side wall and across a portion of the channel to the second side wall. In some embodiments, the third side wall extends beyond the first side wall and the second side wall to form the first flange and the second flange.

In another embodiment, the first flange includes an arcuate surface and the second flange includes an arcuate surface. In some embodiments, the device further includes a third side wall extending from the first side wall to the second side wall, the first flange and the second flange being attached to the third side wall.

In other embodiments, the device includes a first member extending from the first side wall, the first flange extending from the first member and a second member extending from the second side wall, the second flange extending from the second member. In some embodiments, the device further includes a bottom wall extending between the first member and the second member near the first end of the channel. In one embodiment, the first end of the channel extends below the plane of the bottom wall.

In one embodiment, the first side wall and the second side wall converge toward each other near the first end of the device to define a narrower channel entrance, and the first side wall and the second side wall diverge away from each other near the second end to define a wider channel exit.

In some embodiments, the channel includes a straight portion and an arcuate portion. The channel can include a straight portion near the first end of the channel and an arcuate portion near the second end of the channel.

In other embodiments, the device further includes a third flange extending from the first flange to the second flange. In some embodiments, the first flange, the second flange and the third flange form a unitary mounting flange.

In another embodiment, the device further includes a bottom wall extending between the first member and the second member, and a third flange extending from the bottom wall.

In some embodiments, the surface area of the interior of the channel near the second end is greater than the surface area of the interior surface of the channel near the first end.

In one embodiment, the edge of the first side wall at the first end of the channel slopes toward the union of the first wall and the second wall and the edge of the second wall at the first end of the channel slopes toward the union of the first wall and the second wall.

In one embodiment, the device is adapted for attachment to a floatable craft selected from the group consisting of a water ski, a surfboard, a wakeboard, a windsurfer, and a kneeboard. In other embodiments, the device is adapted for attachment to an inflatable, floatable craft selected from the group consisting of a continuous tube, an elongated cylindrical tube, a circular raft, and a polygonal raft.

In another aspect, the invention features a floatable craft that includes an inflatable object and one of the above-devices attached to the inflatable object.

In other aspects, the invention features a device for generating a plume of water, the device including a) a first side wall, and b) a second side wall, the first side wall and the second side wall defining a tapered channel including i) a first end including a channel entrance, ii) a second end including a channel exit, iii) a longitudinal extent extending between the first end and the second end, iv) a straight portion near the first end, and v) an arcuate portion near the second end, the device being capable of attachment to a floatable craft such that when the floatable craft is in motion on a body of water, the device directs water into the channel entrance and out of the channel exit in the form of a plume of water. In one embodiment, the first side wall extends at an angle to the second side wall. In another embodiment, the first side wall and the second side wall define a concave channel. In still other embodiments, the channel further includes a back wall, and the first side wall extends at a first angle to the back wall, and the second side wall extends at a second angle to the back wall.

In one embodiment, the device further includes a first flange extending from the first side wall at an angle to the first side wall, and a second flange extending from the second side wall, at an angle to the second side wall. In some embodiments, the first flange includes an arcuate surface and the second flange includes an arcuate surface. In other embodiments, the device further includes a third side wall, the third side wall extending from the first side wall to the second side wall to enclose a portion of the channel. In one embodiment, the third side wall extends beyond the first side wall and the second side wall to form a first flange and a second flange. In some embodiments, the device further includes a first flange extending from the first side wall at an angle to the first side wall, and a second flange extending from the second side wall, at an angle to the second side wall such that when the device is attached to a floatable craft, the first end of the channel including a portion of the longitudinal extent of the channel is open to receive water. In other embodiments, the device further includes a first flange extending from the first side wall, a second flange extending from the second side wall; and a third side wall extending from the first side wall to the second side wall, the first flange and the second flange being attached to the third side wall.

In another aspect, the invention features an apparatus that includes an inflatable, floatable craft and a device for generating a plume of water attached to the inflated, floatable craft, the device including a) a first side wall, and b) a second side wall, the first side wall and the second side wall defining a tapered channel including i) a first end including a channel entrance, ii) a second end including a channel exit, and iii) a longitudinal extent extending between the first end and the second end, the device is positioned on the inflatable, floatable craft such that when the is inflatable, floatable craft is inflated and in motion on a body of water, the device directs water into the channel entrance and out of the channel exit in the form of a plume of water. In some embodiments, the first side wall and the second side wall converge toward each other along the longitudinal extent of the channel from the first end of the channel to the second end of the channel.

In other embodiments, the first end of the channel terminates at a point above the plane of a body of water when the inflated floatable craft is disposed on the body of water. In other embodiments, the inflatable, floatable craft includes a shape selected from the group consisting of a rectangle, a square, a triangle, a circle and an ellipse. In another embodiment, the inflatable floatable craft includes a pocket, the device for generating a plume of water being disposed in the pocket. In one embodiment, the device is adhered to the inflatable floatable craft.

In some embodiments, the first side wall extends at an angle to the second side wall. In another embodiment, the first side wall and the second side wall define a concave channel. In one embodiment, the channel further includes a back wall, and the first side wall extends at a first angle to the back wall, and the second side wall extends at a second angle to the back wall. In some embodiments, the apparatus further includes a first flange extending from the first side wall at an angle to the first side wall, and a second flange extending from the second side wall, at an angle to the second side wall. In other embodiments, the first flange includes an arcuate surface and the second flange includes an arcuate surface.

In another embodiment, the device of the apparatus further includes a third side wall, the third side wall extending from the first side wall to the second side wall to enclose a portion of the channel. In one embodiment, the third side wall extends beyond the first side wall and the second side wall to form a first flange and a second flange. In another embodiment, the apparatus further includes a first flange extending from the first side wall at an angle to the first side wall, and a second flange extending from the second side wall, at an angle to the second side wall such that when the device is attached to a floatable craft, the first end of the channel including a portion of the longitudinal extent of the channel is open to receive water.

In other aspects, the invention features a method of generating a plume of water with a device including a) a first side wall, and b) a second side wall, the first side wall and the second side wall defining a channel including i) a first end including a channel entrance, ii) a second end including a channel exit, and iii) a longitudinal extent extending between the first end and the second end, the method including: contacting a body of water with the device at a speed sufficient to direct water into the channel entrance of the device and out the channel exit of the device in the form of a plume of water.

In another aspect, the invention features a device for generating a plume of water, the device including a) a back wall, b) a spine attached to the back wall and extending substantially perpendicularly from the back wall, c) a front wall attached to the spine, the front wall including i) a first end, ii) a second end, iii) a longitudinal extend extending between the first end and the second end, iv) a first side wall extending at an angle to the spine, and v) a second side wall extending at an angle to the spine, the front wall tapering from the first end to the second end along the longitudinal extent. In one embodiment, the back wall is arcuate. In other embodiments, the first side wall and the second side wall are arcuate.

The invention features a device that is capable of generating a plume of water behind an inflatable craft, such as an inner tube, as the inflatable craft is pulled behind a boat at relatively high speeds. The device is capable of directing a sufficient volume of water from a body of water, through the device, and into the air to form a plume of water having significant height and volume.

The plume of water provides added excitement for the user as well as the observer. The plume of water also provides greater visibility of the person riding on the craft that is generating the plume by creating a more noticeable presence of the person and the person's position on the lake, which is particularly beneficial to a person riding on a floatable craft that is being towed at a distance behind a boat.

Other features of the invention will be apparent from the following description of preferred embodiments thereof, and from the claims.

BRIEF DESCRIPTION OF THE DRAWINGS

FIG. 8a is a perspective bottom view of a fourth embodiment of a device for generating a plume of water;

FIG. 8b is a perspective side view of the device of FIG. 8a;

FIG. 8c is a side view of the device of FIG. 8a;

FIG. 8d is a front view of the device of FIG. 8a;

DETAILED DESCRIPTION

Referring to the Figures, wherein like numerals are used to designate like features throughout and first to FIGS. 1–5 there is shown a device 10 for generating a plume of water attached to a floatable craft 14 that is in motion across a body of water (W). The device 10 is shown directing water from the body of water (W), up into the air behind the floatable craft 14 in the form of a plume (P) (i.e., a spray) of water, which is known as a rooster tail. As the floatable craft 14 moves across the body of water, one end of the device 10 scrapes the water and directs water into the channel entrance 28, along the longitudinal extent of the channel 20, toward the channel exit 22, where the water leaves the device 10 in the form of a plume. The distance the plume of water projects into the air behind the floatable craft will depend upon the speed at which the floatable craft is traveling. Preferably the device is capable of generating a plume of water that projects into the air a distance of at least about 6 feet, more preferably at least about 12 feet.

Device 10 includes a first end 18 that includes the channel entrance 28 and that contacts the water when the floatable craft is in motion and a second end 16 that includes the channel exit 22 and that contacts air when the floatable craft is in motion. Side walls 24 and 26 extend from the first end 18 to the second end 16 of the device 10 and are positioned at an angle α to each other to define a v-shaped channel 20 having a longitudinal extent 15. The side walls 24, 26 taper along the longitudinal extent of the channel 20 from the second end 16 toward the first end 18 of the device 10 to provide a tapered channel 20 having a relatively wider second end 16, i.e., the channel exit 22, and a relatively narrower first end 18, i.e., the channel entrance 28.

Figure 5:
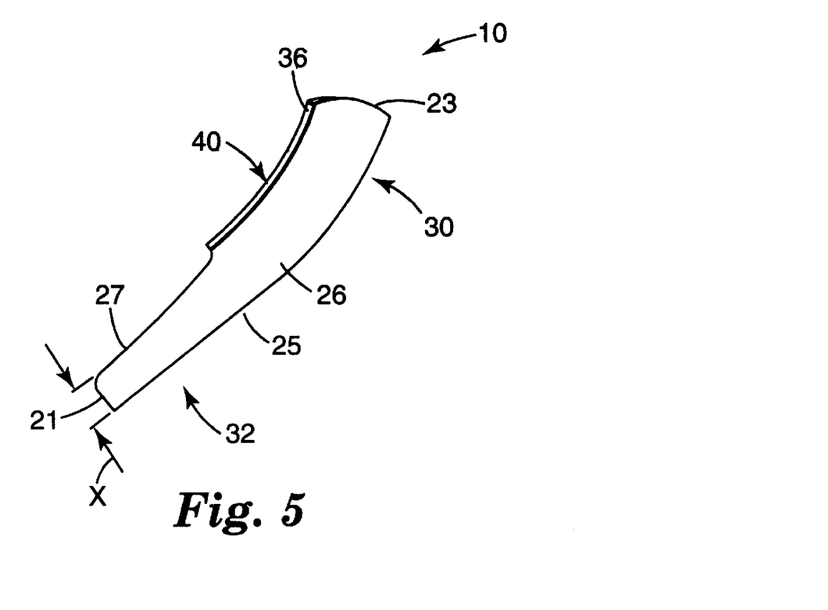
FIG. 5 is a side view of the device of FIG. 4 rotated 90°.

FIG. 5 illustrates the taper of side wall 26 in which the distance X from the union 25 of the two side walls 24, 26 to the longitudinal edge 27 of the side wall 26 decreases from the second end 23 of the side wall 26 to the first end 21 of the side wall 26. The surface area of the interior surface of the channel 20 at the channel entrance 28 is relatively smaller than the surface area of the channel 20 at the channel exit 22. The volume of the channel 20 defined by side walls 24, 26 and an imaginary plane extending across the channel 20 from the longitudinal edge of side wall 24 to the longitudinal edge of side wall 26 is relatively greater at the second end 16 of the device 10 and relatively smaller at the first end 18 of the device 10.

In some embodiments, the side walls converge toward each other near the first end of the channel and diverge away from each other along the longitudinal extent of the channel approaching the second end of the channel, i.e., the angle defined by the side walls is relatively greater at the channel exit and relatively smaller at the channel entrance.

Figure 1:
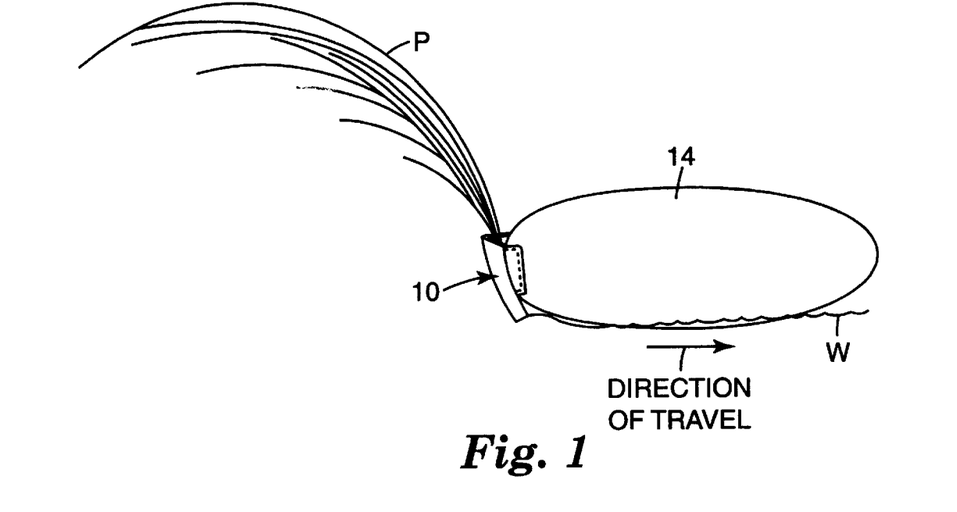
FIG. 1 is a side view of a device for generating a plume of water attached to a floatable craft and generating a plume of water.
Figure 2:
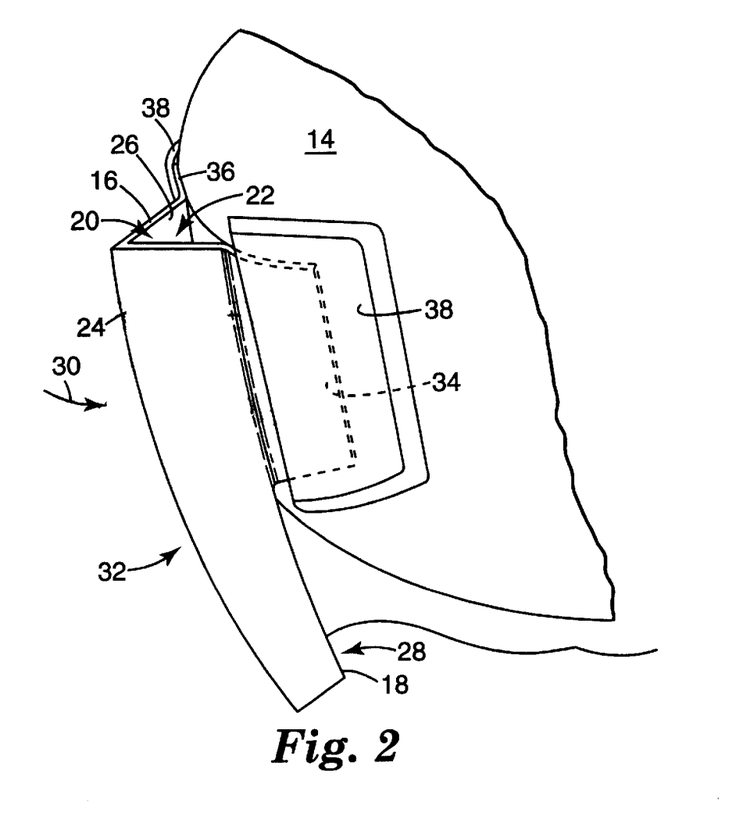
FIG. 2 is an enlarged perspective view of the device of FIG. 1 attached to a floatable craft.
Figure 3:
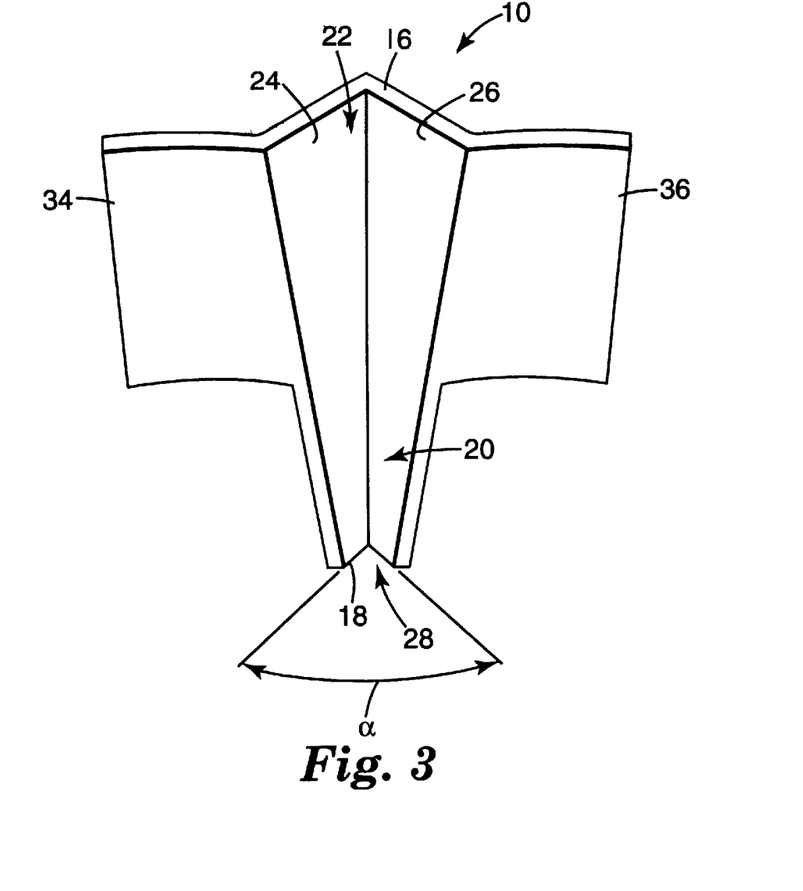
FIG. 3 is a perspective front view of the device of FIG. 2.
Figure 4:
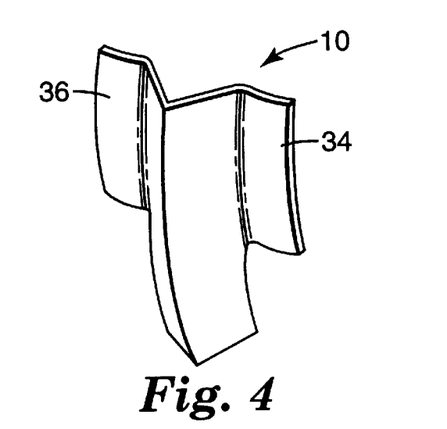
FIG. 4 is a perspective back view of the device of FIG. 3.

The device illustrated in FIGS. 1 and 2 includes a slightly curved upper section 30 that is adapted for attachment to the floatable craft 14 and a relatively straight section 32 extending from the slightly curved section 30. The straight section 30 is not attached to the floatable craft, which allows a portion of the longitudinal extent of the channel 20 to be open to receive water. It is believed that this configuration facilitates the flow of water from the channel entrance 28 (i.e., the region including a portion of the longitudinal extent near the first end) to the channel exit 22.

The device 10 also includes mounting flanges 34, 36 each of which extend from a side wall 24, 26 at an angle to the side wall 24, 26. The mounting flanges 34, 36 provide additional surface area for attaching the device to a floatable craft and for stabilizing the device 10 against the floatable craft 14 during movement of the floatable craft 14. The mounting flanges 34, 36 extend along a portion of the channel 20. The portion of the longitudinal extent of the channel 20 that does not include flanges provides an open face for receiving water when the device 10 is attached to a floatable craft.

The mounting flanges 34, 36 include an arcuate surface for attachment to a floatable craft. Preferably the mounting flange(s) is dimensioned to conform to the surface of the floatable craft 14 to which the device 10 is to be attached. Devices for attachment to a flat, e.g., vertical, surface of a floatable craft, for example, preferably include flanges having a flat surface for contact with the floatable craft.

The device is positioned on the floatable craft such that the water contacting end 18 of the device will scrape a body of water when the floatable craft is in motion and the air contacting end 16 will remain out of the body of water when the craft is in motion. The device is further positioned on the floatable craft such that upon reaching a sufficient speed while traveling on a body of water, water will be directed into the channel entrance 28, along the longitudinal extent of the channel 20, and out of the channel exit 22 in the form of a plume of water. The device is preferably positioned on the floatable craft such that the water contacting end 18 of the device 10 is forward the air contacting end 16 of the device 10 relative to the direction of movement of the floatable craft when the floatable craft is in motion on a body of water.

Figure 6:
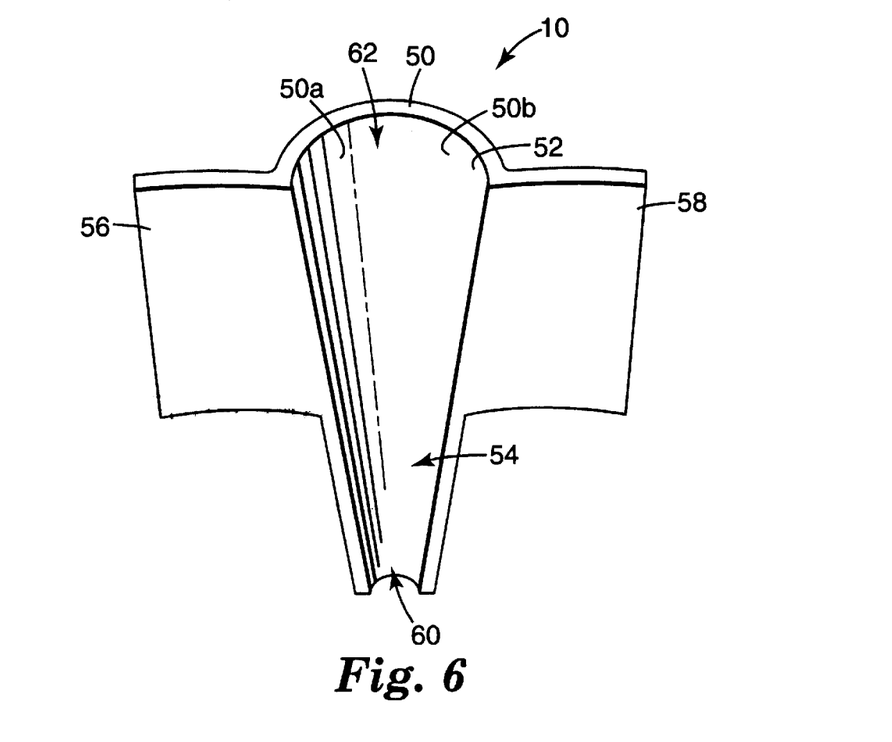
FIG. 6 is a front view of a second embodiment of a device for generating a plume of water.

FIG. 6 shows an embodiment of a device 10 for generating a plume of water that includes a continuous arcuate wall 50 having an interior surface 52 that defines a channel 54. The side walls 50a, 50b are portions of the arcuate wall 50 and taper along the longitudinal extent of the channel from the air contacting end of the device 10 to the water contacting end of the device 10 to define a relatively more narrow channel entrance 60 and a relatively more wide channel exit 62. The device 10 includes flanges 56, 58 extending from a portion of the longitudinal extents of the arcuate wall 50. Each flange 56, 58 extends from the wall 50 at an angle to the wall 50.

Figure 7:
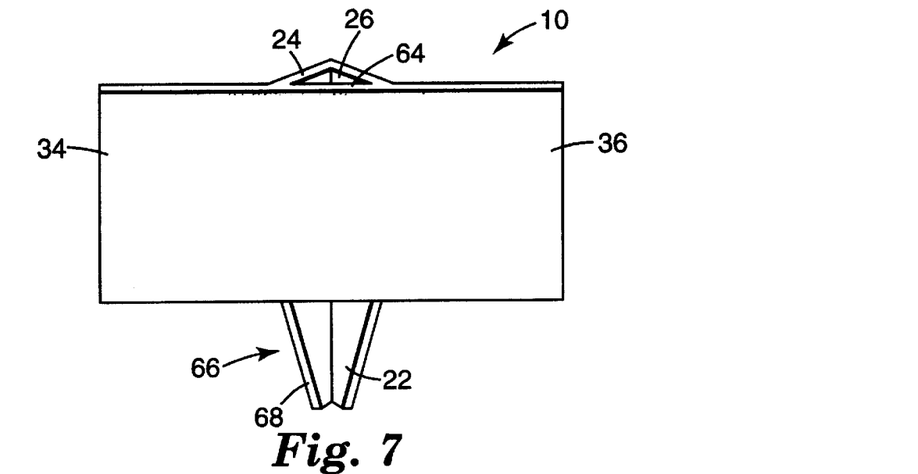
FIG. 7 is a front view of a third embodiment of a device for generating a plume of water.
Figures 8A, 8B:
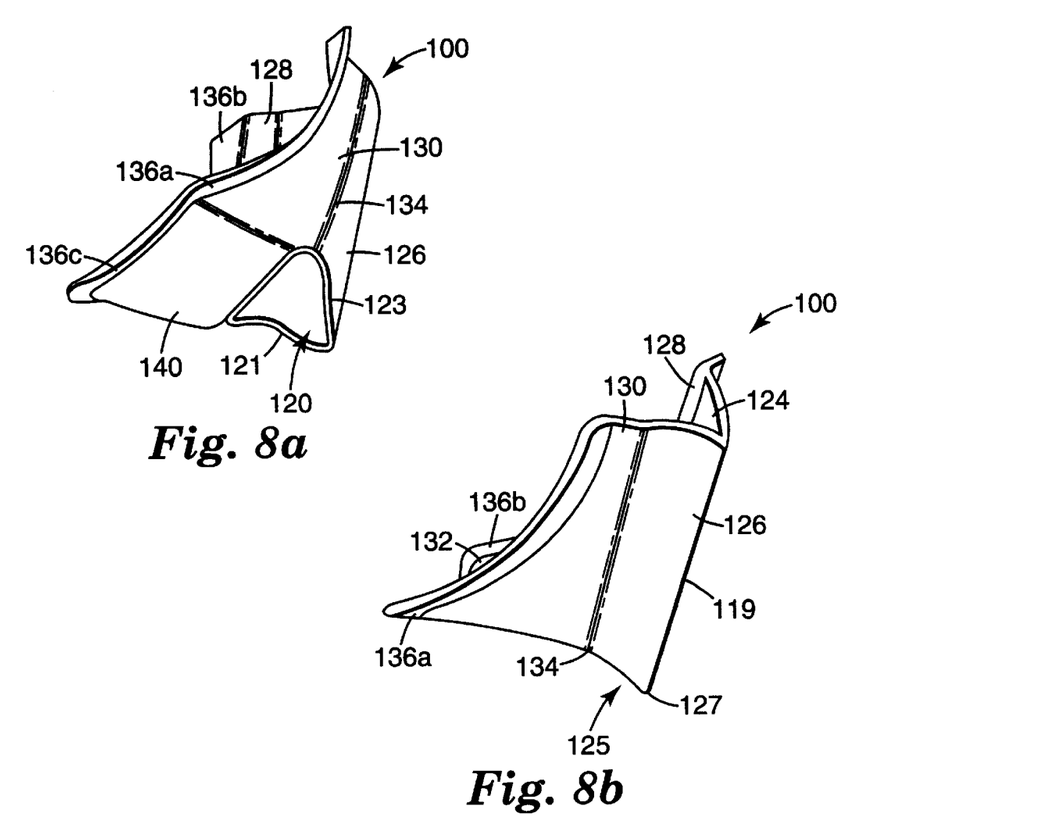
Figure 8C:
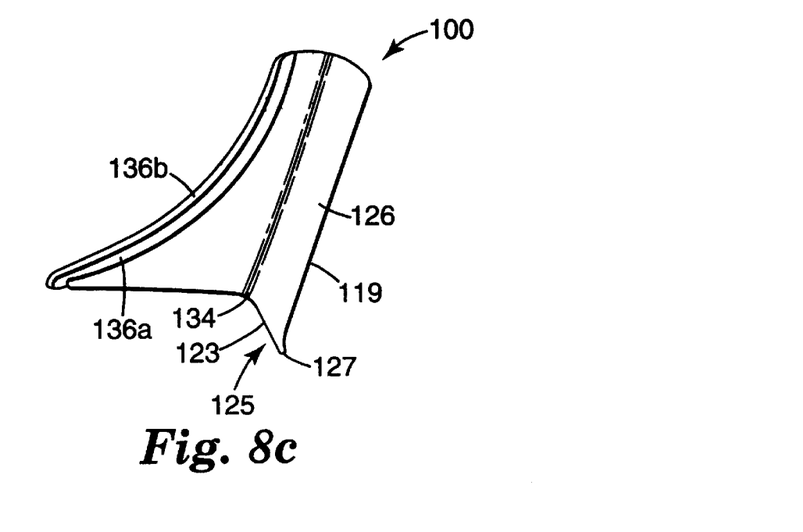
Figure 8D:
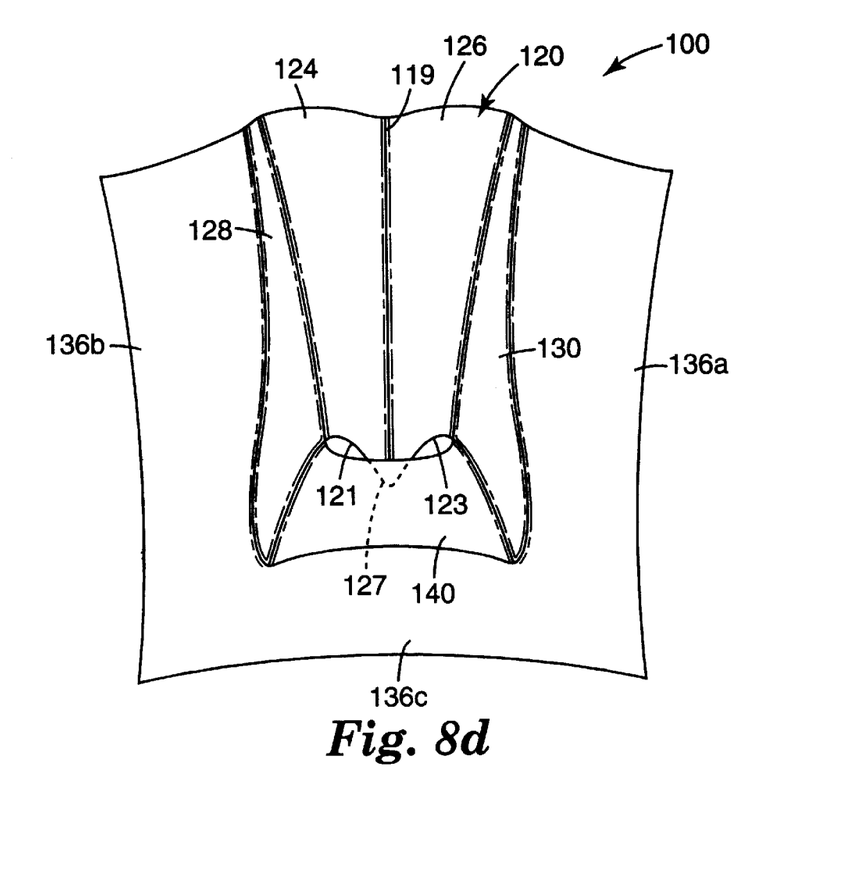

FIG. 7 illustrates an embodiment of device 10 for generating a plume of water that includes a third side wall 64 extending across a portion of the channel 22 from the first side wall 24 to the second side wall 26. The portion 66 of the longitudinal extent of the channel 22 near the water contacting end 68 of the device 10, i.e., the channel entrance, remains open to receive water. The third wall 64 extends beyond the first side wall 24 and the second side wall 26 to provide flanges 34, 36. The device 10 can be molded as a single unit or in multiple parts, which are then attached to each other using mechanisms including, e.g., mechanical fasteners, bonding e.g., adhesive compositions, sonic welding, thermal bonding, and combinations thereof. For example, the flanges and the channel can be a unitary member and the third side wall can be a separate member that is attached to the flanges.

FIGS. 8a–d illustrate an embodiment of a device 100 for generating a plume of water that includes a channel 120 defined by two side walls 124, 126 extending at an angle to each other. Each side wall 124, 126 includes a member 128, 130, respectively, that extends from the side wall 124, 126, respectively, to side flanges 136b and 136a, respectively.

The side walls preferably taper from the first air contacting end of the device 100 to the second water contacting end of the device, i.e., the distance from the union 119 of the side walls to the union 134 of a side wall and the member extending therefrom gradually decreases along the longitudinal extent of the channel from the air contacting end of the device 100 to the water contacting end of the device 100.

Flange 136a extends from member 130 at an angle to member 130 and flange 136b extends from member 128, at an angle to member 128. Flange 136c extends between flange 136b and 136a. The flanges 136a–c have an arcuate surface for contact with an arcuate surface of a floatable craft. The flanges are preferably shaped to conform to the exterior wall of the floatable craft to which they are to be attached. The flange(s) can also extend from a portion of the side wall(s).

A wall 140 extends from the bottom water contacting edge of member 130 to the bottom water contacting edge of member 128 to form the bottom wall 140. The bottom wall 140 can provide additional rigidity to the device 100.

The side walls 124, 126 each have an exposed bottom edge 121, 123, respectively, that slopes toward the union 119 of side wall 124 and side wall 126 at the water contacting end 125 of the device 100 to define a generally v-shaped member 127, which is a continuation of the channel 120 and which extends below the plane of the bottom wall 140. Member 127 of channel 120 is open for direct contact with the body of water and functions to scrape the water and direct water into the channel opening at the water contacting end 125 of the device 100 when the device is attached to a floatable craft and the floatable craft is in motion on a body of water. Excess water is able to flow easily (i.e., without the user experiencing noticeable resistance) around member 127.

Figure 9A:
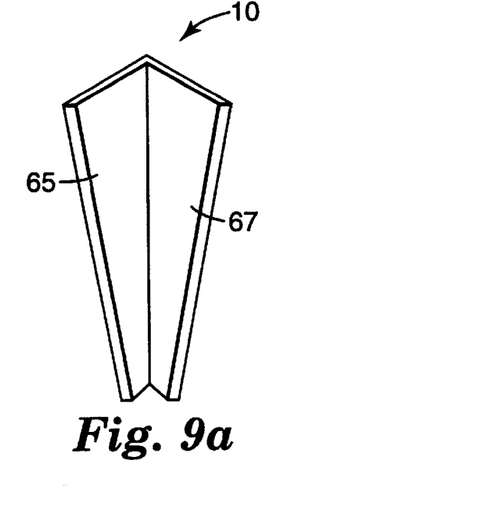
FIG. 9a is a perspective front view of a fifth embodiment of a device for generating a plume of water.
Figure 9B:
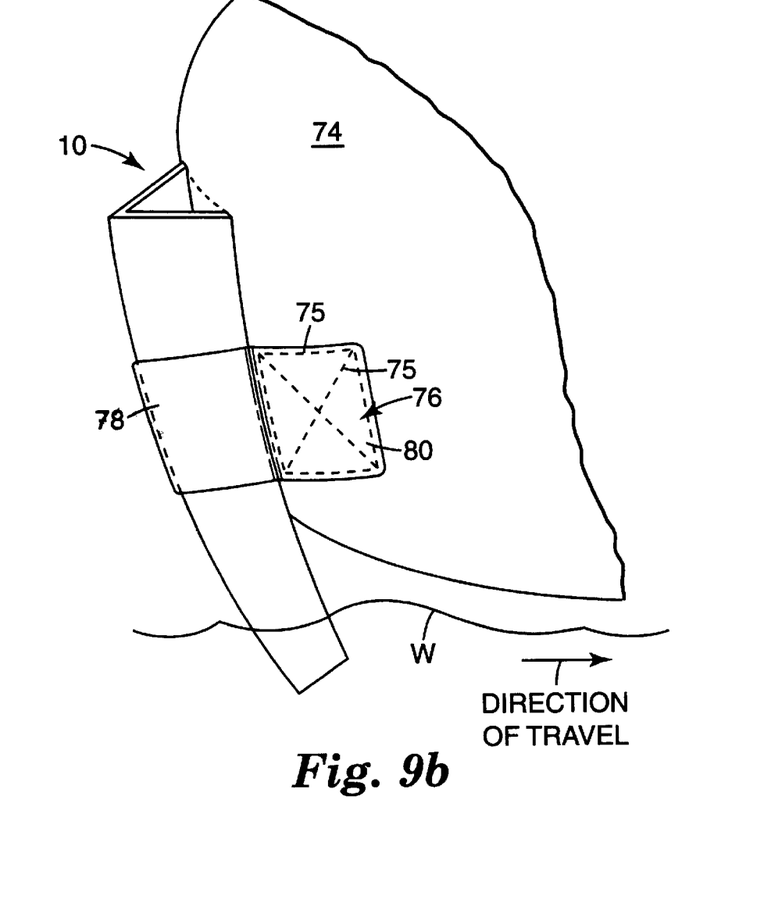
FIG. 9b is a perspective side view of the device of FIG. 9a attached to a floatable craft.
Figure 10:
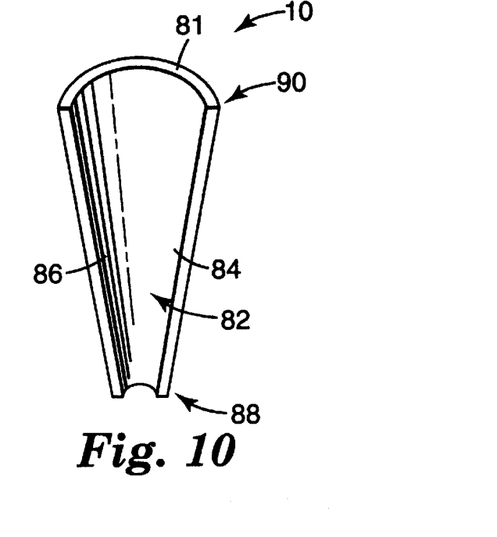
FIG. 10 is a perspective front view of a sixth embodiment of a device for generating a plume of water.
Figure 11:
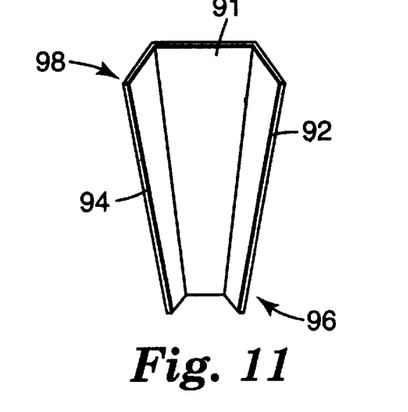
FIG. 11 is a perspective front view of a seventh embodiment of a device for generating a plume of water.

FIGS. 9–11 illustrate embodiments of a device 10 for generating a plume of water that do not include side flanges. FIGS. 9a and 9b show a device for generating a plume of water that includes a v-shaped channel defined by two side walls 65, 67 disposed at an angle to each other.

FIG. 10 illustrates a device for generating a plume of water that includes an arcuate wall 81 defining a curved channel 82 having side wall portions 84, 86 that exhibit a slight taper along the longitudinal extent of the channel from the air contacting end 90 of the device to the water contacting end 88 of the device.

FIG. 11 illustrates an embodiment of a device for generating a plume of water that includes a back wall 91, two side walls 92, 94 extending at an angle from the back wall 91 and converging toward each other near the water contacting end 96 of the device and diverging away from each other near the air contacting end 98 of the device. The side walls 92, 94 also taper along the longitudinal extent of the device from the air contacting end 98 of the device toward the water contacting end 96 of the device.

Figure 12:
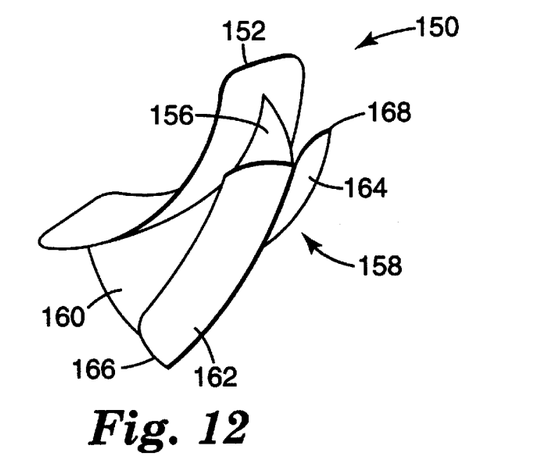
FIG. 12 is a perspective side view of an eighth embodiment of a device for generating a plume of water.

FIG. 12 illustrates an embodiment of a device for generating a plume of water 150 that includes an arcuate back wall 152 curved to match the curvature of a floatable craft 154 to which it is to be attached. A spine 156 extends generally perpendicularly from the center of the back wall 152 to a front wall 158. The front wall 158 is attached to the spine 156 at an angle to a major surface 160 of the spine 156. Preferably the front wall 158 extends at an angle that is less than 90° from a major surface of the spine 160. The front wall 158 includes two side walls 162, 164 that taper along the longitudinal extent of the channel from the air contacting end 168 of the device 150 toward the water contacting end 166 of the device 150. The interior surfaces 170, 172 of side walls 162, 164, respectively, combine to provide a surface having a relatively greater area at the air contacting end 168 of the device 150 and a surface having a relatively smaller area at the water contacting end 166 of the device 150.

The device for generating a plume of water can be attached to a floatable craft through a variety of mechanisms including, e.g., mechanical fasteners, bonding e.g., adhesive compositions, sonic welding, thermal bonding, and combinations thereof. In some embodiments, the flanges are bonded to the floatable craft through adhesive compositions, sonic welding, thermal bonding, and combinations thereof. In other embodiments, a piece of material is positioned around at least a portion of the device and bonded to the floatable craft through mechanical fasteners, adhesive compositions, sonic welding, thermal bonding, and combinations thereof. Examples of suitable materials include the material of the floatable craft, woven materials, polymeric materials including, e.g., polyvinyl chloride and polyurethane, and combinations thereof.

The device can also be inserted into a pocket on the floatable article.

FIG. 2 shows flanges 34, 36 of device 10 inserted into a pocket 38 that is dimensioned to accommodate the flanges 34 (flange 36 is in a pocket that is not visible) of the device 10 and to maintain the device 10 in position during movement of the floatable craft 14. The pocket can be provided through a variety of mechanisms including, e.g., cutting a hole into an outer covering surrounding a portion of the floatable craft or attaching, e.g., by stitching, welding, adhering or a combination thereof, material to the floatable article to form the pocket.

Figure 13:
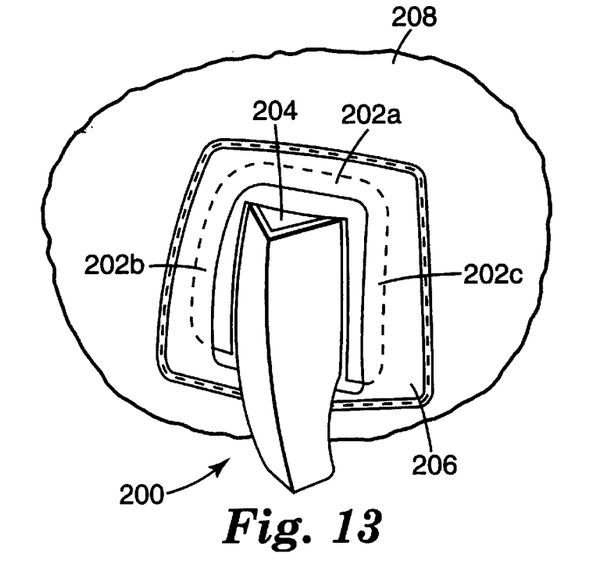
FIG. 13 is a perspective back view of a ninth embodiment of a device for generating a plume of water attached to a floatable craft.

FIG. 13 illustrates a device 200 that includes a third mounting flange 202a at the channel exit 204 positioned in a pocket 206 on a floatable craft 208. The pocket 206 surrounds the flanges 202a, 202b, and 202c of the device and maintains the device 202 in position on the floatable craft 208. Flange 202c extends from flange 202a to flange 202b near the channel exit. Flanges 202a, 202b, 202c form a continuous mounting flange. In other embodiments, flange 202c, 202a, 202b or a combination thereof can extend from a back wall. In another embodiment, the device further includes a fourth (i.e., bottom) flange that extends from flanges 202a and 202b and across a portion of the longitudinal extent at a location between the channel exit and the channel entrance. The bottom flange can also be inserted into a pocket.

FIG. 9b shows a device 10 attached to a floatable craft 74 with an attachment mechanism 76 that includes a strap 78 that extends around the device 10 and is bonded to at least two areas 80 (second area is not shown) on the floatable craft 74 so as to maintain the device 10 in a desired position. The strap 78 is further secured to the floatable craft 74 with stitching 75.

Figure 14:
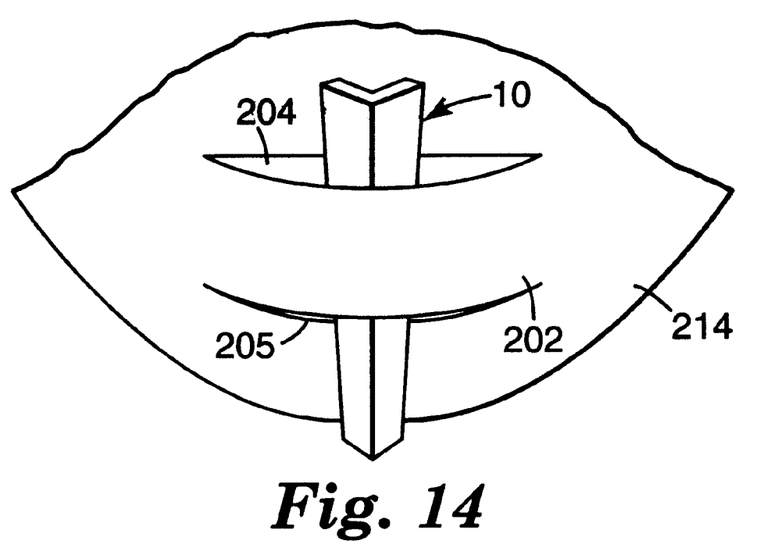
FIG. 14 is a perspective view of a device for generating a rooster tail attached to a floatable craft.

FIG. 14 illustrates a device 10 for generating a rooster tail that is held in position on a floatable craft 214 by a strap 202 that has been cut 204, 205 from an encasement 206 that envelopes the floatable craft 214.

The device for generating a plume of water can be attached to a variety of floatable crafts including, e.g., inflatable crafts that are pulled behind speed boats including, e.g., continuous inflatable tubes (e.g., tire inner tubes), rafts, and inflatable crafts having a variety of shapes and dimensions including, e.g., polygonal (e.g., square, triangular and rectangular), circular, elliptical, banana-shaped, and floatable craft such as boats, water skis, surfboards, windsurfers, wakeboards, and kneeboards.

Other embodiments are within the claims. For example, a floatable craft can include any number of devices for generating a plume of water to provide multiple plumes of water when the floatable craft is in motion across a body of water. The flanges can also be of various dimensions including, e.g., height, length and width, to accommodate different mounting applications and methods.

The channel of the device for generating a plume of water can also be defined by side walls that converge toward each other near the water contacting end of the device to define a narrower channel entrance and diverge away from each other near the air contacting end of the device to define a relatively wider channel exit.

What is claimed is:

1. A device for generating a plume of water, said device comprising:
   a) a first side wall;
   b) a second side wall extending at an angle to said first side wall,
   said first side wall and said second side wall defining a tapered channel, said channel comprising
      i) a first end,
      ii) a second end, and
      iii) a longitudinal extent extending between said first end and said second end;
   c) a first flange extending at an angle to said first side wall; and
   d) a second flange extending at an angle to said second side wall.

2. The device of claim 1, wherein said first flange extends from a portion of said first side wall and said second flange extends from a portion of said second side wall.

3. The device of claim 1, further comprising a third side wall, said third side wall extending from said first side wall and across a portion of said channel to said second side wall.

4. The device of claim 3, wherein said third side wall extends beyond said first side wall and said second side wall to form said first flange and said second flange.

5. The device of claim 1, wherein said first flange comprises an arcuate surface and said second flange comprises an arcuate surface.

6. The device of claim 1 further comprising a third side wall extending from said first side wall to said second side wall, said first flange and said second flange being attached to said third side wall.

7. The device of claim 1 further comprising
   a first member extending from said first side wall, said first flange extending from said first member; and
   a second member extending from said second side wall, said second flange extending from said second member.

8. The device of claim 7 further comprising a bottom wall extending between said first member and said second member near said first end of said channel.

9. The device of claim 8 wherein said first end of said channel extends below the plane of said bottom wall.

10. The device of claim 1, wherein said first side wall and said second side wall converge toward each other near said first end of said device to define a narrower channel entrance, and said first side wall and said second side wall diverge away from each other near said second end to define a wider channel exit.

11. The device of claim 1 wherein said channel comprises a straight portion and an arcuate portion.

12. The device of claim 1 wherein said channel comprises straight portion near said first end of said channel and an arcuate portion near said second end of said channel.

13. The device of claim 1 further comprising a third flange extending from said first flange to said second flange.

14. The device of claim 13 wherein said first flange, said second flange and said third flange form a unitary mounting flange.

15. The device of claim 7 further comprising
   a bottom wall extending between said first member and said second member; and
   a third flange extending from said bottom wall.

16. The device of claim 1 wherein the surface area of the interior of said channel near said second end is greater than the surface area of the interior surface of said channel near said first end.

17. The device of claim 1 wherein the edge of said first side wall at said first end of said channel slopes toward the union of said first wall and said second wall and the edge of said second wall at said first end of said channel slopes toward the union of said first wall and said second wall.

18. The device of claim 1 adapted for attachment to a floatable craft selected from the group consisting of a water ski, a surfboard, a wakeboard, a windsurfer, and a kneeboard.

19. The device of claim 1, adapted for attachment to an inflatable, floatable craft selected from the group consisting of a continuous tube, an elongated cylindrical tube, a circular raft, and a polygonal raft.

20. A floatable craft comprising an inflatable object and the device of claim 1 attached to said inflatable object.

21. A device for generating a plume of water, said device comprising:
   a) a first side wall; and
   b) a second side wall,
   said first side wall and said second side wall defining a tapered channel comprising
      i) a first end comprising a channel entrance,
      ii) a second end comprising a channel exit,
      iii) a longitudinal extent extending between said first end and said second end,
      iv) a straight portion near said first end, and
      v) an arcuate portion near said second end,
   said device being capable of attachment to a floatable craft such that when the floatable craft is in motion on a body of water, said device directs water into said channel entrance and out of said channel exit in the form of a plume of water.

22. The device of claim 21 wherein said first side wall extends at an angle to said second side wall.

23. The device of claim 21 wherein said first side wall and said second side wall define a concave channel.

24. The device of claim 21 wherein said channel further comprises a back wall, and said first side wall extends at a first angle to said back wall, and said second side wall extends at a second angle to said back wall.

25. The device of claim 21 further comprising a first flange extending from said first side wall at an angle to said first side wall, and a second flange extending from said second side wall, at an angle to said second side wall.

26. The device of claim 25, wherein said first flange comprises an arcuate surface and said second flange comprises an arcuate surface.

27. The device of claim 21, further comprising a third side wall, said third side wall extending from said first side wall to said second side wall to enclose a portion of said channel.

28. The device of claim 27, wherein said third side wall extends beyond said first side wall and said second side wall to form a first flange and a second flange.

29. The device of claim 21 further comprising a first flange extending from said first side wall at an angle to said first side wall, and a second flange extending from said second side wall, at an angle to said second side wall such that when said device is attached to a floatable craft, said first end of said channel including a portion of said longitudinal extent of said channel is open to receive water.

30. The device of claim 21, further comprising:
   a first flange extending from said first side wall;
   a second flange extending from said second side wall; and
   a third side wall extending from said first side wall to said second side wall,
   said first flange and said second flange being attached to said third side wall.

31. The device of claim 30 adapted for attachment to a floatable craft selected from the group consisting of a jet ski, a surfboard, and a windsurfer.

32. The device of claim 30, adapted for attachment to an inflatable, floatable craft selected from the group consisting of a continuous tube, an elongated cylindrical tube, a circular raft, and a polygonal raft.

33. An apparatus comprising
   an inflatable, floatable craft; and
   a device for generating a plume of water attached to said inflated, floatable craft, said device comprising:
      a) a first side wall, and
      b) a second side wall;
      said first side wall and said second side wall defining a tapered channel comprising
         i) a first end comprising a channel entrance,
         ii) a second end comprising a channel exit, and
         iii) a longitudinal extent extending between said first end and said second end,
      said device being positioned on said inflatable, floatable craft such that when said is inflatable, floatable craft is inflated and in motion on a body of water, said device directs water into said channel entrance and out of said channel exit in the form of a plume of water.

34. The apparatus of claim 33, wherein said first side wall and said second side wall converge toward each other along said longitudinal extent of said channel from said first end of said channel to said second end of said channel.

35. The apparatus of claim 33 wherein said first end of said channel terminates at a point above the plane of a body of water when the inflated floatable craft is disposed on the body of water.

36. The apparatus of claim 33, wherein said inflatable, floatable craft comprises a shape selected from the group consisting of a rectangle, a square, a triangle, a circle and an ellipse.

37. The apparatus of claim 33, wherein said inflatable floatable craft comprises a pocket, said device for generating a plume of water being disposed in said pocket.

38. The apparatus of claim 33, wherein said device is adhered to said inflatable floatable craft.

39. The apparatus of claim 33 wherein said first side wall extends at an angle to said second side wall.

40. The apparatus of claim 33 wherein said first side wall and said second side wall define a concave channel.

41. The apparatus of claim 33 wherein said channel further comprises a back wall, and said first side wall extends at a first angle to said back wall, and said second side wall extends at a second angle to said back wall.

42. The apparatus of claim 33 further comprising a first flange extending from said first side wall at an angle to said first side wall, and a second flange extending from said second side wall, at an angle to said second side wall.

43. The apparatus of claim 42, wherein said first flange comprises an arcuate surface and said second flange comprises an arcuate surface.

44. The apparatus of claim 33, further comprising a third side wall, said third side wall extending across a portion of said channel from said first side wall to said second side wall.

45. The apparatus of claim 44, wherein said third side wall extends beyond said first side wall and said second side wall to form a first flange and a second flange.

46. The apparatus of claim 33 further comprising a first flange extending from said first side wall at an angle to said first side wall, and a second flange extending from said second side wall, at an angle to said second side wall such that when said device is attached to a floatable craft, said first end of said channel including a portion of said longitudinal extent of said channel is open to receive water.

47. An apparatus comprising
   a floatable craft; and
   a device for generating a plume of water attached to said floatable craft, said device comprising:
      a) first side wall, and
      b) a second side wall extending at an angle to said first side wall;
      said first side wall and said second side wall defining a tapered channel comprising
         i) a first end comprising a channel entrance,
         ii) a second end comprising a channel exit, and
         iii) a longitudinal extent extending between said first end and said second end,
         iv) a straight portion near said first end, and
         v) an arcuate portion near said second end,
      said device being positioned on said floatable craft such that when said floatable craft is in motion on a body of water, said device directs water into said channel entrance and out of said channel exit in the form of a plume of water.

48. A device for generating a plume of water, said device comprising:
   a) a back wall;
   b) a spine attached to said back wall and extending substantially perpendicularly from said back wall;
   c) a front wall attached to said spine, said front wall comprising
      i) a first end;
      ii) a second end;
      iii) a longitudinal extend extending between said first end and said second end;
      iv) a first side wall extending at an angle to said spine; and
      v) a second side wall extending at an angle to said spine,
   said front wall tapering from said first end to said second end along said longitudinal extent.

49. The device of claim 48, wherein said back wall is arcuate.

50. The device of claim 48, wherein said first side wall and said second side wall are arcuate.

* * * * *